United States Patent

Nakamura

[19]

[11] Patent Number: 5,971,130
[45] Date of Patent: Oct. 26, 1999

[54] WORKPIECE IDENTIFICATION PROVIDING METHOD, WORKPIECE, WORKPIECE IDENTIFYING METHOD AND APPARATUS THEREOF, AND SHEET METAL MACHINING APPARATUS

[76] Inventor: Kaoru Nakamura, 2-18-13 Takamori, Isehara-shi, Kanagawa, Japan

[21] Appl. No.: 08/691,532

[22] Filed: Aug. 2, 1996

[51] Int. Cl.[6] .......................... B65G 43/00; B21B 37/00; B23K 26/00; A06K 7/08

[52] U.S. Cl. ..................... 198/340; 198/349; 428/131; 428/192; 428/596; 219/121.69; 219/121.85; 235/440; 235/445; 235/447; 235/453; 235/475; 235/489; 209/619; 209/554

[58] Field of Search ..................... 235/447, 489, 235/445, 446, 475, 453, 440; 428/131, 192, 596; 219/121.69, 121.85; 234/120; 83/552; 198/358, 339.1, 341.01, 340, 349, 502.1; 29/34 R; 209/619, 554

[56] References Cited

U.S. PATENT DOCUMENTS

| | | | |
|---|---|---|---|
| 3,735,771 | 5/1973 | Panissidi | 137/15 |
| 3,869,082 | 3/1975 | Ludin | 235/61.1 H |
| 4,317,030 | 2/1982 | Berghell | 235/489 |
| 4,349,731 | 9/1982 | Berner | 235/489 |
| 4,503,323 | 3/1985 | Flam | 235/489 |
| 4,708,901 | 11/1987 | Wood | 428/131 |
| 4,764,667 | 8/1988 | Abe et al. | 235/462 |
| 4,768,410 | 9/1988 | Wood | 83/63 |
| 5,291,647 | 3/1994 | Fukasaw et al. | 29/564 |

*Primary Examiner*—Paul Thibodeau
*Assistant Examiner*—Holly Rickman
*Attorney, Agent, or Firm*—Greenblum & Bernstein, P.L.C.

[57] ABSTRACT

A workpiece identifying method is provided, being characterized in that a plurality of identification areas of plural columns and rows are plotted in an identification mark providing region provided in the area of the unused portion of a workpiece or a product, identification holes are formed in the proper number of identification areas, whereby an identification mark is provided to the workpiece or the product. A workpiece is produced with identification holes formed in the proper number of identification areas. An identifying method for detecting the identification holes formed in the proper number of identification areas of the workpiece and workpiece identification apparatus are also provided. Sheet metal machining apparatus is further provided, having the workpiece identification apparatus placed in a workpiece feed device side or a carry-away device side for a sheet metal work machine. Thus, an identification mark is easily and surely provided to the workpiece, making it easy to identify the same.

16 Claims, 5 Drawing Sheets

FIG.4

|   | IDENTI-FICATION SENSOR (7A) | IDENTI-FICATION SENSOR (7B) | IDENTI-FICATION SENSOR (7C) | IDENTI-FICATION SENSOR (7D) |
|---|---|---|---|---|
| A | ON | ON | ON | ON |
| B | OFF | ON | ON | ON |
| C | ON | OFF | ON | ON |
| D | ON | ON | OFF | ON |
| E | ON | ON | ON | OFF |
| F | OFF | OFF | ON | ON |
| G | ON | OFF | OFF | ON |
| H | ON | ON | OFF | OFF |
| I | OFF | ON | ON | OFF |
| J | OFF | ON | OFF | ON |
| K | ON | OFF | ON | OFF |
| L | OFF | OFF | OFF | ON |
| M | ON | OFF | OFF | OFF |
| N | OFF | ON | OFF | OFF |
| O | OFF | OFF | OFF | ON |
| P | OFF | OFF | OFF | OFF |

WORKPIECE IDENTIFICATION PROVIDING METHOD, WORKPIECE, WORKPIECE IDENTIFYING METHOD AND APPARATUS THEREOF, AND SHEET METAL MACHINING APPARATUS

BACKGROUND OF THE INVENTION

1. Field of the Invention

The present invention relates to a method and apparatus for providing a workpiece with an identification mark, a method and apparatus for identifying a workpiece, and a sheet metal machining apparatus having a workpiece identifying apparatus.

2. Prior Art

Conventionally, as means for providing workpieces with identification marks, there has been known means for etching characters or numerals on workpieces by means of a punch press, attaching bar codes thereto, or by performing laser marking by means of laser beam machining.

However, in such conventional means for etching of workpieces, providing bar codes or carrying out laser marking, the size of apparatus inevitably become large. Further, when etchings, bar codes or laser marks on workpieces made of sheet metals were read by an identification apparatus, it was difficult to clearly confirm the results of reading if the workpieces or products were dirty or damaged because of little difference in light and darkness between their original colors and the codes. Consequently, it was rather difficult to manage the workpieces or the products.

SUMMARY OF THE INVENTION

It is an object of the invention to provide a workpiece identification providing method, a workpiece and a workpiece identifying method, apparatus and sheet metal machining apparatus thereof, whereby identification marks can be easily provided to workpieces and the workpieces can be easily and surely identified.

In accordance with a first aspect of the invention, in order to achieve the above-noted object, workpiece identification providing method is provided for plotting a plurality of identification areas of plural columns and rows in an identification mark providing region provided in the unused portion of a workpiece or a product, forming identification holes in the proper number of identification areas, thereby providing the workpiece or the product with an identification mark.

In accordance with a second aspect of the invention, a workpiece is produced in a manner that an identification mark providing region is provided in the unused portion of a workpiece or a product, a plurality of identification areas of plural columns and rows are plotted in this identification mark providing region and identification holes are formed in the proper number of identification areas.

Therefore, according to the first and second aspects of the invention, since the identification mark providing region is provided in the unused portion of the workpiece or the product, the plurality of identification areas of plural columns and rows are plotted in this identification mark providing region and the identification holes are formed in the proper number of identification areas, it is possible to easily provide the workpiece with an identification mark and surely and easily identify the workpiece.

In accordance with a third aspect of the invention, identifying of a workpiece or a product is performed in a manner that an identification mark providing region is provided in the unused portion of a workpiece or a product, a plurality of identification areas of plural columns and rows are plotted in this identification mark providing region, identification holes are plotted in the proper number of identification areas, an identification sensor is provided in one side of the fact of the workpiece or the product corresponding to the identification areas and the identification holes are detected by this identification sensor.

In accordance with a fourth aspect of the invention, workpiece identification apparatus is provided, having an identification body comprising an identification mark providing region formed in the unused portion of a workpiece or a product, identification areas of plural columns and rows plotted in this identification mark providing region, identification holes formed in the proper number of identification areas and an identification sensor provided in one side of the face of the workpiece or the product corresponding to each of the identification areas for detecting the identification holes.

Therefore, according to the third and fourth aspects of the invention, the identification holes formed in the proper number of identification areas of the workpiece or the product are detected by the identification sensor provided in one side of the face of the workpiece or the product in the identification body, making it possible to surely and easily identify the workpiece. Moreover, apparatus itself can be made simpler than that of the conventional type, reducing its manufacturing costs.

In accordance with a fifth aspect of the invention, sheet metal machining apparatus includes devices for feeding and carrying away a workpiece to and from a sheet metal work machine, wherein the feed device or the carry-away device is provided with workpiece identification apparatus for identifying the positional relationship of holes placed in the workpiece.

Therefore, since the work identification apparatus is provided in the feed device or the carry-away device before or after the workpiece is machined by the sheet metal work machine, an identification mark can be provided to the workpiece or the product before of after this is machined and the workpiece or the product can be surely and easily identified.

In accordance with a sixth aspect of the invention, in the sheet metal machining apparatus of the fifth aspect, the workpiece identification apparatus is an identification body comprising an identification mark providing region provided in the unused portion of the workpiece or the product, a plurality of identification areas of plural columns and rows plotted in this identification mark providing region, identification holes formed in the proper number of identification areas and an identification sensor provided in one side of the face of the workpiece or the product corresponding to each of the identification areas for detecting the identification holes.

Therefore, the identification apparatus can be made simpler than that of the conventional type, reducing its manufacturing costs. Further, since the work identification apparatus itself is made small, it is easy and simple to attach this to the feed device or the carry-away device.

The nature, principle and utility of the invention will become more apparent from the following detailed description when read in conjunction with the accompanying drawings.

BRIEF DESCRIPTION OF THE DRAWINGS

In the accompanying drawings:

FIG. 4 illustrates detected signals when various identification holes of FIG. 2 are detected;

PREFERRED EMBODIMENTS OF THE INVENTION

Next, the preferred embodiments of the invention will be described in detail with reference to the accompanying drawings.

Figure 1:
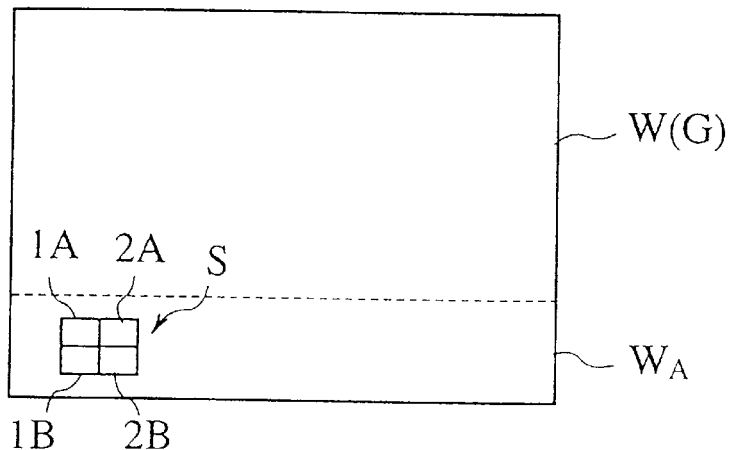
FIG. 1 illustrates providing of an identification mark to a workpiece or a product.

Referring to FIG. 1, an identification mark providing region S is shown to be provided in, for instance the left side part of the area $W_A$ (lower side portion of FIG. 1) of the unused portion of a workpiece W or a product G machined by a sheet metal work machine. In this identification mark providing region S, a plurality of identification areas 1A, 2A, 1B and 2B of plural columns and rows, for instance two columns and two rows, are plotted in square forms having each side of, e.g., 2 mm.

Figure 2:
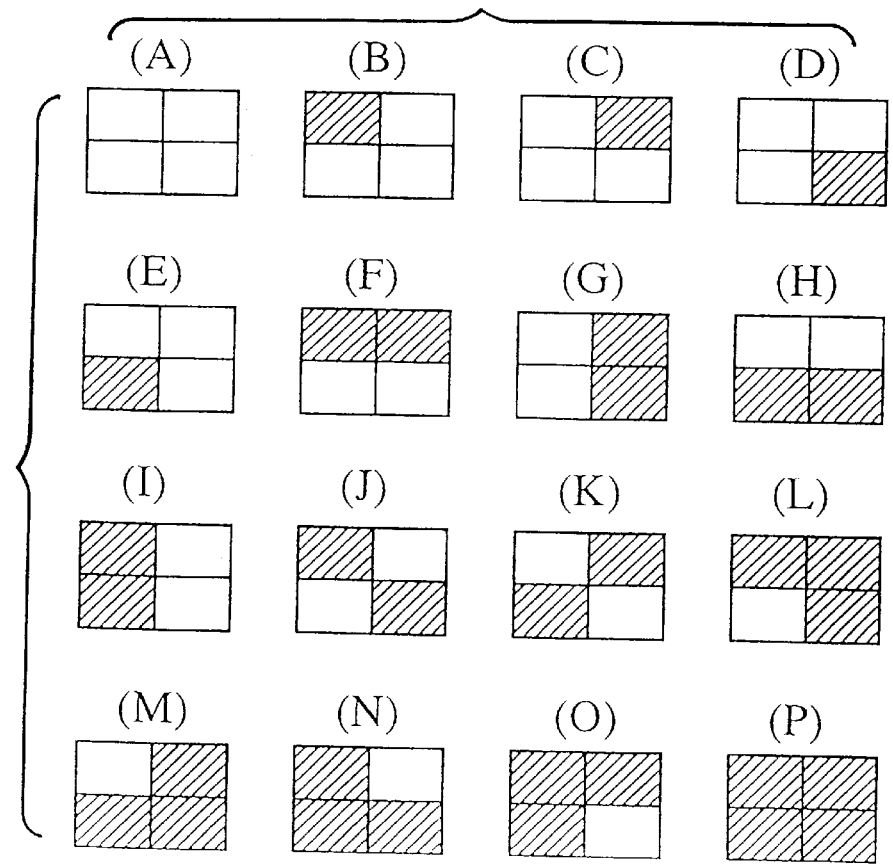
FIG. 2 illustrates forming of identification holes in the proper number of identification areas of plural columns and rows.

In the proper number of these plotted identification areas 1A, 2A, 1B and 2B, identification holes are formed being punched cooperatively by, for instance the punch of a punch press and a die. That is, for these identification holes 1A, 2A, 1B and 2B, identification holes like those (A) to (P) in FIG. 2 are punched, creating 16 cases. In (A) to (P) in FIG. 2, hatched parts represent identification holes.

The form of each punched hole is not limited to a square each side having, for instance 2 mm. Alternatively, a circular, rectangular or triangular form may be adopted and the hole may be a ditch, not punched, rather than a punched hole. It is desired to perform punching by means of cooperative work between the punch and the die. However, a laser beam machining device or a drilling machine may be utilized to punch holes. The numbers of plural columns and rows are not limited to two columns and two rows. These may be 3 or more or may be different between columns and rows.

Figure 3:
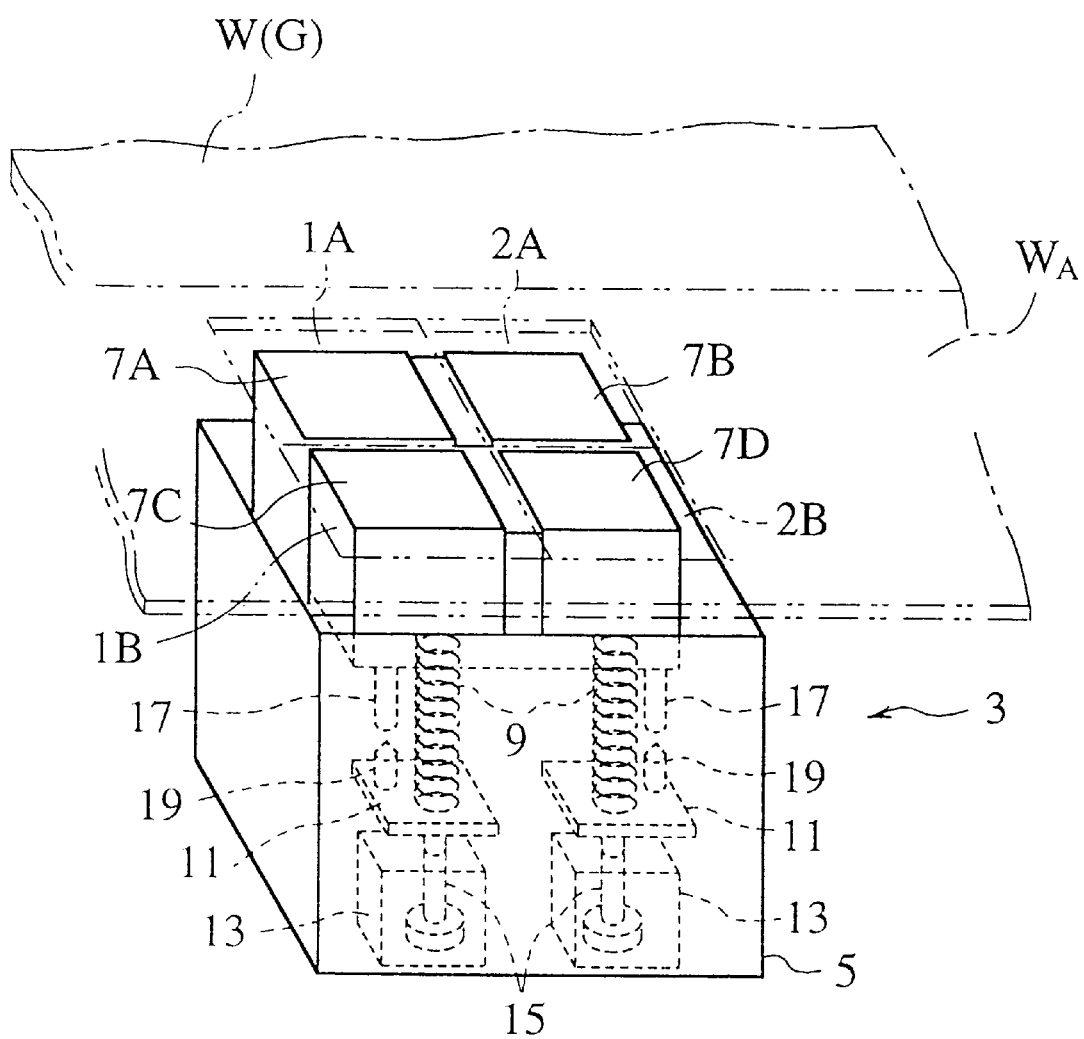
FIG. 3 shows in perspective an example of work identification apparatus for detecting identification holes formed in a workpiece or a product.

As a workpiece identification apparatus 3 for detecting the identification holes (hatched parts) indicated by (A) to (P) in FIG. 2, a box-like identification body 5 with its upper part opened like that shown in FIG. 3 is provided on one side, for instance the lower side, of the workpiece W or the product G. In the upper part of the identification body 5, four identification sensors 7A, 7B, 7C and 7D a little smaller than the identification areas 1A, 2A, 1B and 2B are provided.

The upper ends of springs 9 are attached to the bottoms of the identification sensors 7A, 7B, 7C and 7D and the lower end of each spring 9 is attached to a vertical motion plate 11. This vertical motion plate 11 is integrally linked with the tip of a piston rod 15 attached to a vertical motion cylinder 13.

In the bottom part of each of the identification sensors 7A, 7B, 7C and 7D, a dog 17 is provided drooping therefrom. A limit switch 19 is provided in each vertical motion plate 11 placed opposite to each dog 17. The output of each limit switch 19 is provided to a control apparatus 31 (FIG. 5B) through a communication line 29 (e.g., a network connection, a serial connection, or a parallel connection) provided in the workpiece identification apparatus 3. The control apparatus 31 may include a host controller comprising a central processing unit (CPU), a random access memory (RAM), a non-volatile memory (e.g., hard disk), a network interface, a serial/parallel interface, and a monitor.

In such a structure, the identification sensors 7A, 7B, 7C and 7D are raised via each vertical motion plate 11 and each spring 9 after each vertical motion cylinder 13 is actuated and the piston rod 15 is raised.

For example, as shown by (B) in FIG. 2, if there is a hole punched in the identification area 1A, when the identification sensors 7A, 7B, 7C and 7D are raised, only the identification sensor 7A passes through the hole formed in the identification area 1A. The remaining identification sensors 7B, 7C and 7D come into contact with the bottom surface of the workpiece W or the product G because of no holes formed in the identification sensors 7B, 7C and 7D continue to be pressed, each spring 9 shrinks, bringing the dog 17 into contact with the limit switch 19. As a result, a signal indicating the identification sensor 7A OFF and the identification sensors 7B, 7C and 7D ON is sent to the control apparatus. Likewise, for (A) and (C) to (P) of FIG. 2, the identification sensors 7A to 7D are switched ON/OFF. ON/OFF states of (A) to (P) of FIG. 2 are like those shown in FIG. 4 and even if the workpiece W or the product G is dirty and somewhat damaged, totally 16 kinds of identification can be surely and easily carried out.

This workpiece identification apparatus 3 is constructed by the box-like identification body 5, the identification sensors 7A to 7D, the springs 9, the vertical motion plates 11, the vertical motion cylinders 13, the piston rods 15, the dog 17 and the limits switches 19. Thus, the apparatus itself can be made simpler and smaller than the conventional identification apparatus, reducing its manufacturing costs.

Formation of 16 divisions in the workpiece W or the product G makes it extremely easy to perform management based on the size or the shape of the workpiece W or the product G.

As the workpiece identification apparatus 3, an example of the apparatus like that shown in FIG. 3 was cited. Other than such apparatus, any of a CCD camera, a photoelectric sensor and other sensors can be utilized, so long as it is capable of detecting the identification holes.

Figure 5A:
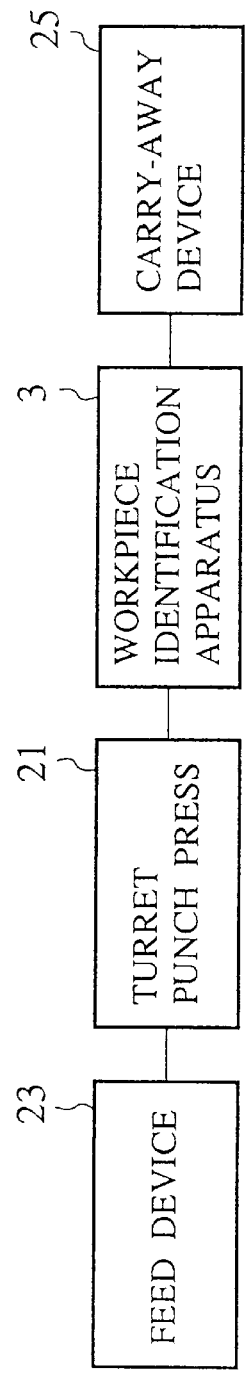
FIGS. 5A and 5B, respectively, show an example of workpiece identification apparatus arranged with sheet metal machining apparatus.
Figure 5B:
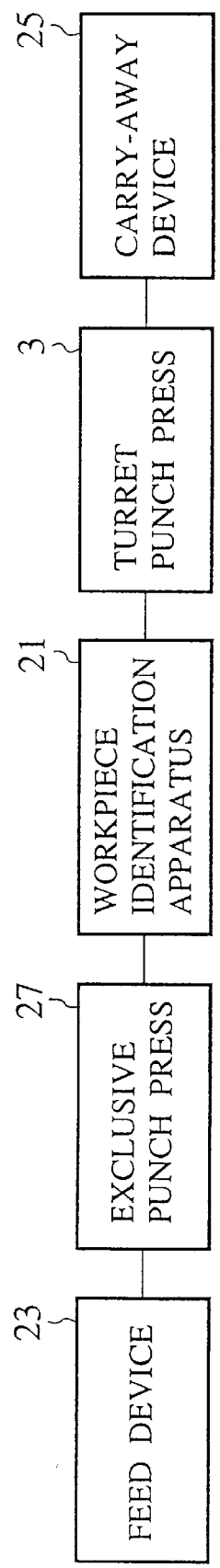

FIGS. 5A and 5B each show an exemplary sheet metal machining system according to the present invention. As shown in FIG. 5A, the sheet metal machining system may include a sheet metal work machine, such as a turret punch press 21, and feed and carry-away devices 23 and 25 that are provided adjacent to each other and in proximity (e.g., near the front and rear) of the turret punch press 21. The feed and carry-away devices 23 and 25 may comprise suitable machinery or equipment, such as a conveyor system, a robotic manipulating/handling system, and/or a magnetic lifting device, to handle and transport sheet metal to and from the turret punch press 21.

Referring to FIG. 5A, the workpiece identifying apparatus 3 like that shown in FIG. 3 is shown to be provided between the turret punch press 21 and the carry-away device 25. The workpiece W is fed to the turret punch press 21 by means of the feed device 23 and by using this turret punch press 21, desired holes are punched. Before or after punching of these desired holes, a plurality of identification areas 1A, 2A, 1B and 2B of plural columns and rows like those shown in FIG. 1 are plotted in the identification mark providing region S provided in the area $W_A$ of the unused portion of the workpiece W or the product G and identification holes like those shown by (A) to (P) of FIG. 2 are created in the proper number of these identification areas 1A, 2A, 1B and 2B.

The turret punch press 21 may include one or more pipe roller tables (e.g., a front pipe roller table and a rear pipe roller table) for receiving and transferring the workpiece W. In addition, a feed clamp or a carry-away clamp device may be used to clamp and feed the workpiece W from the turret punch press 21 to the workpiece identification apparatus 3. The feed clamp or carry-away clamp device may be used independently or in combination with one or more pipe roller tables to feed the workpiece W.

The workpiece W may be supported and positioned by either the carry-away clamp device or the pipe roller table(s) such that the identification holes formed in identification areas 1A, 2A, 1B and 2B are positioned over the workpiece identification apparatus 3. A sensor device (not shown) may be used to detect when the workpiece W is positioned such that the identification areas are properly aligned with the workpiece identification apparatus 3. Based on a control signal from the sensor device, feeding of the workpiece W may be terminated (e.g., by stopping the pipe feed rollers or movement of the clamp device) when the identification areas are properly aligned. Alternatively, a stop member, for example, an L-angle aligning with the edge of the workpiece W, may be used to stop and position the workpiece W so that the identification areas are properly aligned with the workpiece identification areas. Based on the detected result of the identification holes in the workpiece identification apparatus 3 like that shown in FIG. 3, the workpiece is placed in a desired position and carried away by the carry-away device 25. In this manner, the identification holes can be punched on the workpiece W or the product G on the line of the sheet metal machining apparatus while sheet metals are simultaneously machined.

Referring to FIG. 5B, an exclusive punch press 27 dedicated to creating of identification holes and the workpiece identification apparatus 3 are shown between the feed device 23 and the turret punch press 21. After identification holes are punched on the workpiece W by means of the exclusive punch press 27. The workpiece W may be fed from the exclusive punch press 27 by a feed clamp or a carry-away clamp device. The feed clamp or carry-away clamp device may clamp and feed the workpiece W from the exclusive punch press 27 to the workpiece identification apparatus 3. The feed clamp or carry-away clamp device may be used independently or in combination with one or more pipe roller tables of the exclusive punch press 27 to feed the workpiece W.

The workpiece W may be supported and positioned by either the carry-away clamp device or the pipe roller table(s) such that the identification holes formed in identification areas 1A, 2A, 1B and 2B are positioned over the workpiece identification apparatus 3. A sensor device (not shown) may be used to detect when the workpiece W is positioned such that the identification areas are properly aligned with the workpiece identification apparatus 3. Based on a control signal from the sensor device, feeding of the workpiece W may be terminated (e.g., by stopping the pipe feed rollers or movement of the clamp device) when the identification areas are properly aligned. Alternatively, a stop member, for example, an L-angle aligning with the edge of the workpiece W, may be used to stop and position the workpiece W so that the identification areas are properly aligned with the workpiece identification areas. The identification holes are identified by the workpiece identification apparatus 3 and, based on the detected identification holes, desired holes are punched by the turret punch press 21. At this time, the name of the product to be machined should be identified based on the detected result of the identification holes and a machining program therefor should be called from the host control apparatus to the NC device of the turret punch press 21. Then, the workpiece is carried away to a desired position by the carry-away device 25. In this case, the workpiece identification apparatus 3 may be placed between the turret punch press 21 and the carry-away device 25. Therefore, it is clear that the same effects can be obtained as in the case of FIG. 5A. The punch press 27 dedicated to creating of identification holes may be constructed by placing punches and dies smaller in number than the identification areas and providing a small ram in each or movably positioning small rams on the punches. Alternatively, simpler one having small tonnage may be utilized.

By referring to FIGS. 5A and 5B, the example of the turret punch press 21 was cited as a sheet metal work machine. Alternatively, laser beam machining apparatus or a bending machine may be utilized for the same purpose. However, if a sheet metal work machine other than the turret punch press 21 is provided in FIG. 5A, it is desired to punch identification holes on the workpiece W or the product G by providing the exclusive punch press 27 before or after the sheet metal work machine.

Figure 6A:
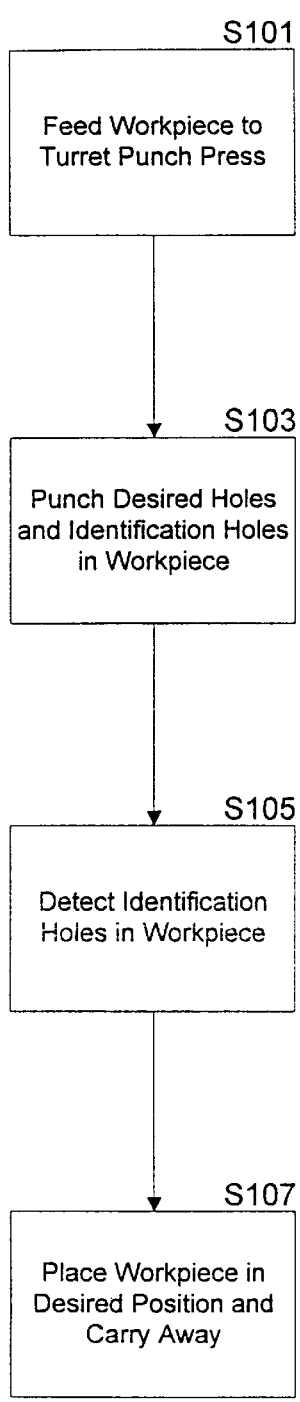
FIGS. 6A and 6B, respectively, are flowcharts illustrating the process by which a workpiece is marked and identified by the workpiece identification apparatus according to the present invention.
Figure 6B:
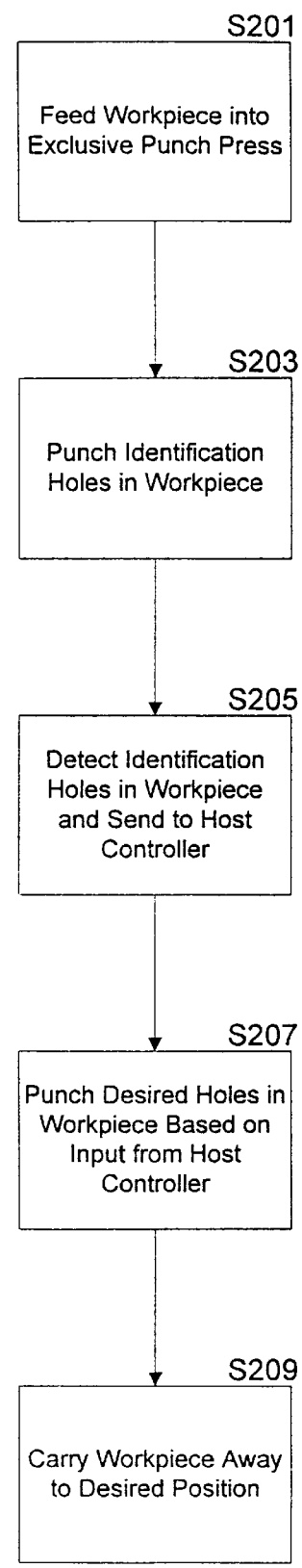

FIGS. 6A and 6B are flowcharts illustrating the operation of the systems of FIGS. 5A and 5B, respectively. Referring to FIG. 6A, in step S101, the workpiece W is fed to the turret punch press 21 by means of the feed device 23. In step S103, desired holes are punched by the turret punch press 21, and identification holes like those shown by (A) to (P) of FIG. 2 are created in the proper number of the identification areas 1A, 2A, 1B and 2B. Then, in step S105, the identification holes are detected by the workpiece identification apparatus 3, and based on the detected result of the identification holes, in step S107, the workpiece is placed in a desired position and carried away by the carry-away device 25.

Referring to FIG. 6B, in step S201, the workpiece W is feed into the exclusive punch press 27 dedicated to creating of identification holes. In step S203, the exclusive punch press 27 punches the identification holes in the workpiece W. In step S205, the identification holes are identified by the workpiece identification apparatus 3, which sends a signal representative of the identified workpiece to the host controller 31. In step S207, based on the input from host controller 31 to the NC of the turret punch press 21, the desired holes are punched by the turret punch press 21. In step S209, the workpiece is carried away to a desired position by the carry-away device 25.

Apparent from the foregoing description of the embodiments, according to the first and second aspects of the invention, since the identification mark providing region is provided in the area of the unused portion of the workpiece or the product, a plurality of identification areas of plural columns and rows are plotted in this identification mark providing region and identification holes are formed in the proper number of these identification areas, even if the workpiece or the product is dirty or damaged, it is possible to easily provide an identification mark to the workpiece and easily and surely identify the same.

According to the third and fourth aspects of the invention, since the identification holes formed in the proper number of identification areas in the workpiece or the product are detected by the identification sensor provided in the identification body provided in one side of the face the workpiece or the product, it is possible to surely and easily identify the same. Further, the apparatus itself can be made simpler than the conventional type, reducing its manufacturing costs.

According to the fifth aspect of the invention, since the workpiece identification apparatus is provided in the feed device side or the carry-away device side before or after machining the workpiece by the sheet metal work machine, it is possible to provide an identification mark to the product before or after machining the workpiece and surely and easily identify the workpiece or the product.

According to the sixth aspect of the invention, the workpiece identification apparatus can be made simpler than the conventional type, reducing its manufacturing costs. Also, since the workpiece identification apparatus itself is made small, it is simple and easy to attach this to the feed device or the carry-away device.

The invention should not in any way be limited to the above-described embodiments. Appropriate modifications and changes can be made and other modes of implementation are possible.

What is claimed:

1. A metal workpiece identification providing method comprising:
    plotting a plurality of identification areas of plural columns and rows in an identification mark providing region provided in an area, formed unitarily and continuously with the workpiece, of an unused portion of the workpiece; and
    forming identification holes in a predetermined number of identification areas, all of said identification holes having a substantially equal size, thereby providing an identification mark to the workpiece.

2. A metal workpiece identification providing method according to claim 1, further comprising detecting whether or not an identification hole is formed in each identification area.

3. A metal workpiece comprising:
    an identification mark providing region provided in an area, formed unitarily and continuously with the workpiece, of an unused portion of the workpiece;
    a plurality of identification areas of plural columns and rows plotted in the identification mark providing region; and
    identification holes formed in a predetermined number of identification areas, all of said identification holes having a substantially equal size.

4. A metal workpiece identifying method comprising:
    providing an identification mark providing region in an area, formed unitarily and continuously with the workpiece, of an unused portion of the workpiece;
    plotting a plurality of identification areas of plural columns and rows in this identification mark providing region;
    forming identification holes in a predetermined number of identification areas, all of said identification holes having a substantially equal size;
    providing identification sensors corresponding to the identification areas on one side of a face of the workpiece; and
    identifying the workpiece by detecting the identification holes by means of the identification sensors.

5. A metal workpiece identifying method according to claim 4, wherein each said identification sensor comprises a body housing a plurality of sensors, each sensor including a mounting mechanism for movement of each sensor toward and away from the workpiece.

6. A metal workpiece identifying method according to claim 5, wherein said mounting mechanism comprises a piston and cylinder arrangement.

7. A metal workpiece identifying method according to claim 6, wherein said piston and cylinder arrangement further comprises a spring biasing the associated sensor with respect to the workpiece.

8. A metal workpiece identification method according to claim 4, further comprising detecting whether or not an identification hole is formed in each identification area.

9. A metal workpiece identification apparatus comprising an identification body,
    wherein the identification body includes identification sensors provided on one side of a face of the workpiece, an identification mark providing region is provided in an area, formed unitarily and continuously with the workpiece, of an unused portion of the workpiece, identification areas of plural columns and rows are plotted in the identification mark providing region, identification holes are formed in a predetermined number of identification areas, all of said identification holes having a substantially equal size, and the identification holes are detected by the identification sensors provided corresponding to the respective identification areas.

10. A metal workpiece identification apparatus according to claim 4, wherein each said identification sensor comprises a body housing a plurality of sensors, each sensor including a mounting mechanism for movement of each sensor toward and away from the workpiece.

11. A metal workpiece identification apparatus according to claim 10, wherein said mounting mechanism comprises a piston and cylinder arrangement.

12. A metal workpiece identification apparatus according to claim 11, wherein said piston and cylinder arrangement further comprises a spring biasing the associated sensor with respect to the workpiece.

13. A metal workpiece identification apparatus according to claim 9, wherein said identification sensors are configured to detect whether or not an identification hole is formed in each identification area.

14. Sheet metal machining apparatus comprising a workpiece feed device and a carry-away device for a sheet metal work machine,
    wherein the feed device or the carry-away device is provided with a workpiece identification apparatus for identifying positional relations of holes punched in a metal workpiece, all of said identification holes having a substantially equal size;
    wherein the workpiece identification apparatus is an identification body constructed so that an identification mark providing region is provided in an area, formed unitarily and continuously with the workpiece, of an unused portion of the workpiece, a plurality of identification areas of plural columns and rows are plotted in the identification mark providing region, identification holes are formed in a predetermined number of identification areas and identification sensors corresponding to the respective identification area are provided on one side of a face of the workpiece to detect the identification holes; and wherein each said identification sensor comprises a body housing a plurality of sensors, each sensor including a mounting mechanism for movement of each sensor toward and away from the workpiece.

15. Sheet metal machining apparatus according to claim 14, wherein said mounting mechanism comprises a piston and cylinder arrangement.

16. Sheet metal machining apparatus according to claim 15, wherein said piston and cylinder arrangement further comprises a spring biasing the associated sensor with respect to the workpiece.

* * * * *

UNITED STATES PATENT AND TRADEMARK OFFICE
CERTIFICATE OF CORRECTION

PATENT NO.   : 5,971,130
DATED        : October 26, 1999
INVENTOR(S)  : K. NAKAMURA It is certified that error appears in the above-identified patent and that said Letters Patent is hereby corrected as shown below:

At column 8, line 33 (claim 10, line 2) of the printed patent, "4" should be ---9---.

At column 9, line 1 (claim 14, line 18) of the printed patent, "area" should be ---areas---.

Signed and Sealed this

Nineteenth Day of December, 2000

Q. TODD DICKINSON

Attest:

Attesting Officer

Commissioner of Patents and Trademarks